United States Patent Office 2,859,222
Patented Nov. 4, 1958

---

2,859,222

7α-ACYLTHIO SUBSTITUTION PRODUCTS OF 4-ANDROSTEN-3-ONES

Raymond M. Dodson, Park Ridge, and Robert C. Tweit, Wilmette, Ill., assignors to G. D. Searle & Co., Chicago, Ill., a corporation of Delaware No Drawing. Application December 31, 1957
Serial No. 706,261

5 Claims. (Cl. 260—397.3)

The present invention relates to 7α-acylthio substitution products of 4-androsten-3-ones. The compositions of this invention can be represented by the general structural formula

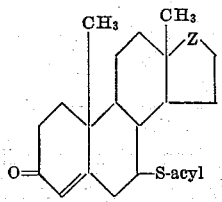

in which Z can represent carbonyl, hydroxymethylene, (lower)alkanoyloxymethylene and benzoyloxymethylene and acyl represents a (lower)alkanoyl radical. Among the (lower)alkanoyl radicals which acyl can represent or which may be included within the "lower alkanoyloxy" radicals are formyl, acetyl, propionyl, butyryl, valeryl, hexanoyl, heptanoyl, octanoyl, and branched-chain isomers thereof, said alkanoyl radicals being the acyl radicals of alkanoic acids containing fewer than nine carbon atoms.

Compositions of the present invention can be prepared by the addition of a thioalkanoic acid of the structural formula

R″COSH wherein R″ represents hydrogen or a lower alkyl radical, to a 4,6-androstadien-3-one which has the structural formula

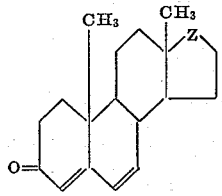

wherein Z has the same meaning as aforesaid. The addition reaction proceeds fairly rapidly at elevated temperatures, such as those in excess of 50°, and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100°. Heating periods of up to a few hours are sufficient to achieve substantial conversion to the desired reaction product. Typically, the desired compound is obtained in a satisfactory state of purity by direct filtration of the cooled reaction mixture, preceded, where necessary, by removal of excess thioalkanoic acid. If desired, however, the reaction product can be purified by chromatographic techniques using adsorbents such as silica gel followed by elution with mixtures of ethyl acetate and benzene.

The free mercaptan corresponding to the 7-acylthio derivatives of the present invention can be obtained by the mild hydrolysis of the acylthio derivatives.

The addition of the thioalkanoic acids to the 6,7-double bond of the starting materials employed in the practice of this invention proceeds under steric influences such that of the stereoisomers formed, one is obtained in predominant amount. The isomer obtained in predominant amount has in each case been characterized herein as possessing the α-configuration of the 7-acylthio group. This configuration has been designated in order to provide a more complete exposition of the present invention, and in order that the specification shall constitute a more useful contribution to the art. However, the designated configuration of the 7-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The compounds of the present invention have useful pharmacological properties and specifically are androgenic and myotrophic agents.

This invention will appear more fully from the examples which follow. These examples are set forth by way of illustration only and it will be understood that the invention is not to be construed as limited in spirit or in scope by the details contained therein, as many modifications in materials and in methods will be apparent from this disclosure to those skilled in the art. In these examples, temperatures are given in degrees centigrade (° C.) and quantities of materials are expressed in parts by weight and parts by volume which bear the same relation one to the other as kilograms to liters.

*Example 1*

A solution of 2 parts by weight of 4,6-androstadiene-3,17-dione and 1 part by volume of thioacetic acid is heated and irradiated with ultraviolet light for 2 hours. The reaction mixture is evaporated to dryness under vacuum to yield 7-acetylthio-4-androstene-3,17-dione as an amorphous solid; $[\alpha]_D = +87.5°$; ultraviolet extinction coefficient 16,300 at 238 millimicrons.

*Example 2*

A mixture of 1.5 parts by weight of 17β-hydroxy-4,6-androstadien-3-one benzoate and 1.5 parts by volume of thioacetic acid is heated on the steam bath for 1 hour. A further quantity of 1 part by volume of thioacetic acid is added and the heating continued for 2 hours. After standing overnight, the mixture is heated for 1 hour, the reaction mixture concentrated to dryness under vacuum and the residue triturated with 20 parts by volume of ether. Part of the solid crystallizes and the crystals and the supernatant liquor are decanted and the glass remaining dissolved in 10 parts by volume of methylene chloride. The methylene chloride solution is concentrated to dryness and triturated with 20 parts by volume of ether. The precipitate which forms is recrystallized from acetone-ether to yield 7α-acetylthiotestosterone benzoate; melting point 185–186°; $[\alpha]_D = +37°$.

*Example 3*

A mixture of 8 parts by weight of 17β-hydroxy-4,6-androstadien-3-one and 8 parts by volume of thiopropionic acid is heated on the steam bath for 30 minutes, cooled, diluted with 100 parts by volume of ether and the solid residue which forms collected and recrystallized from acetone-ether to yield 7α-propionylthiotestosterone;

melting point 234–236° (dec.); ultraviolet extinction coefficient 19,800 at 238 millimicrons.

Example 4

A mixture of 1 part by weight of 7α-propionylthiotestosterone, 4 parts by volume of isobutyric anhydride and 8 parts by volume of pyridine are warmed gently until the solid is dissolved and then allowed to stand overnight at room temperature. The mixture is poured into water, extracted with methylene chloride, the methylene chloride extract washed successively with sodium carbonate solution and water, and finally concentrated to dryness in vacuo. The residue is dissolved in 100 parts by volume of benzene and the resulting solution chromatographed on silica gel. The chromatographic column is washed with 2000 parts by volume of benzene and eluted with 2000 parts by volume of 5% ethyl acetate in benzene. The solvent is removed from the eluate to yield 7α-propionylthiotestosterone isobutyrate as a glass with a maximum in the ultraviolet absorption spectra at 238 millimicrons. This compound exhibits infrared absorption maxima at about 5.75, 5.9, 6.15 and 10.7 microns.

Example 5

A mixture of 1.1 parts by weight of 17β-hydroxy-4,6-adrostadien-3-one propionate and 1 part by volume of thiopropionic acid is heated on the steam bath for 4 hours. The reaction mixture is concentrated to dryness in vacuo, the residue dissolved in 100 parts by volume of benzene and the resulting solution chromatographed on silica gel. The chromatographic column is washed with 2000 parts by volume of benzene and eluted with 2000 parts by volume of 5% ethyl acetate in benzene. The solvent is removed from the eluate to yield 7α-propionylthiotestosterone propionate as a glass; $[\alpha]_D = -2.43°$; ultraviolet extinction coefficient 16,400 at 238 millimicrons.

Example 6

A mixture of 1.1 parts by weight of 17β-hydroxy-4,6-androstadien-3-one propionate and 1 part by volume of 3-methylbutanethiolic acid is heated on the steam bath for 4 hours. The reaction mixture is concentrated to dryness in vacuo, the residue dissolved in 100 parts by volume of benzene and the resulting solution chromatographed on silica gel. The chromatographic column is washed with 2000 parts by volume of benzene and eluted with 2000 parts by volume of 5% ethyl acetate in benzene. The solvent is removed from the eluate to yield 7α-isovalerylthiotestosterone propionate as a glass having a maximum in the ultraviolet absorption spectra at 238 millimicrons. This compound exhibits infrared absorption maxima at about 5.75, 5.9, 6.15 and 8.4 microns.

What is claimed is:

1. A 7-acylthio-4-androstenone of the formula

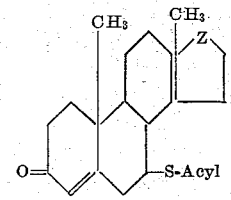

wherein acyl is a (lower)alkanoyl radical and Z is selected from the group consisting of carbonyl, hydroxymethylene, (lower)alkanoyloxymethylene and benzoyloxymethylene.

2. 7-acetylthio-4-androstene-3,17-dione.
3. 7-acetylthiotestosterone benzoate.
4. 7-propionylthiotestosterone.
5. 7-propionylthiotestosterone propionate.

No references cited.